(No Model.)
J. A. LIDBACK.
LATHE CHUCK.
No. 538,334. Patented Apr. 30, 1895.
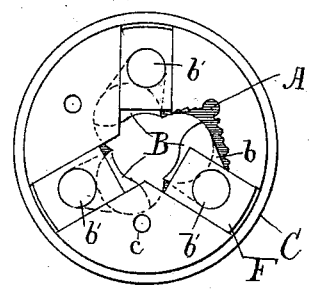
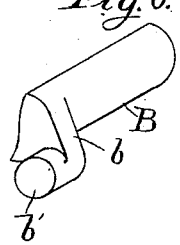
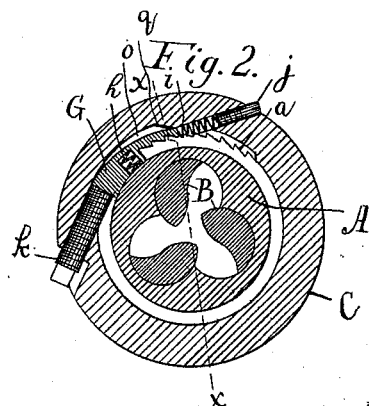
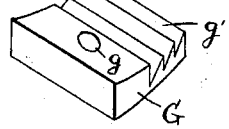
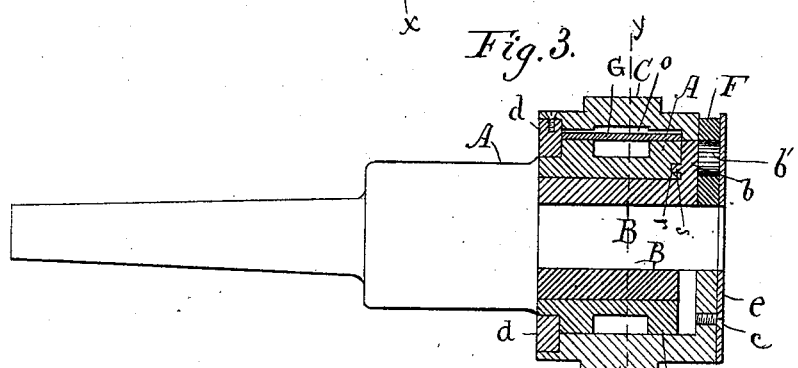
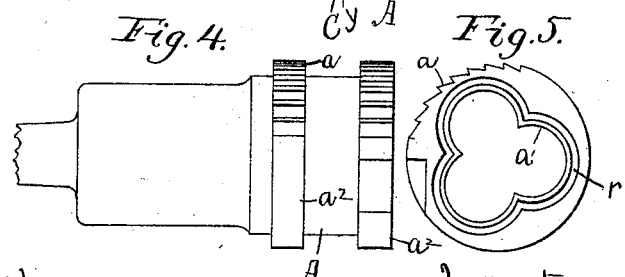

UNITED STATES PATENT OFFICE.

JOHN A. LIDBACK, OF PORTLAND, MAINE, ASSIGNOR OF ONE-HALF TO EDWARD T. BURROWES, OF SAME PLACE.

LATHE-CHUCK.

SPECIFICATION forming part of Letters Patent No. 538,334, dated April 30, 1895.

Application filed September 22, 1894. Serial No. 523,804. (No model.)

*To all whom it may concern:*

Be it known that I, JOHN A. LIDBACK, a citizen of the United States, residing at Portland, in the county of Cumberland and State of Maine, have invented certain new and useful Improvements in Lathe-Chucks; and I do hereby declare the following to be a full, clear, and exact description of the invention, such as will enable others skilled in the art to which it appertains to make and use the same.

My invention relates to lathe chucks of that class wherein the jaws are pivoted eccentrically in the chuck head and are provided with means by which they are rotated simultaneously for the purpose of decreasing or increasing the opening between them and of securing the shank of the tool.

The objects of my invention are to simplify the chuck and to make it in such form that it can be cheaply constructed and also to provide means by which the jaws may be quickly adjusted to any size of tool. These objects I attain by means of the mechanism hereinafter set forth and claimed.

In the accompanying drawings I show a lathe chuck constructed according to my invention.

In the drawings, Figure 1 is an end or front view of the chuck with a portion cut away from the face plate. Fig. 2 is a section on the line $y\ y$ of Fig. 3. Fig. 3 is a section on the line $x\ x$ of Fig. 2. Fig. 4 is a side elevation of the chuck head. Fig. 5 is an end view of the same. Fig. 6 is a perspective view of one of the jaws, and Fig. 7 a perspective view of the pawl.

A represents the chuck head formed as here shown with two annular projections $a^2$ having ratchets $a\ a$ formed thereon. In the end of the chuck head are cylindrical recesses $a'$ formed around a common center and in these recesses fit the jaws B the body portions of which have the form of cylindrical segments.

The outer ends of the jaws are provided with crank arms $b$ having crank pins $b'$ therein. The jaws are provided with means by which they are held in position in the recesses $a'$. As here shown I form a groove $r$ in the end of the chuck head around each of the recesses $a'$ and concentric therewith and on the inner side of the crank arm is a pin or projection $s$ which fits into this groove. It will be seen that the jaws can thus turn in their cylindrical recesses without falling inward, being held outward by the pins $s$. The working faces of the jaws are eccentric with relation to the center of rotation so that as the jaws are turned the recess between them is made greater or smaller according to the direction of rotation. An adjusting cap C is provided for rotating the jaws. This cap C fits over the end of the chuck and in the end are formed as many radiating grooves as there are jaws, in the present instance three. In each of the grooves there is a guide block F to which is journaled the crank pin $b$. As the cap C is turned the guide blocks carry the crank pins around in a circle, themselves sliding in and out to correspond to the position of the crank arms. A covering plate $e$ is secured to the face of the cap C by screws $c$ for the purpose of keeping the blocks F in place.

It will be seen that by turning the cap C the jaws may be quickly adjusted to any desired position but it is necessary to clamp them in the right position.

The clamping of the jaws is effected by means of the pawl G which is contained in a recess $o$ formed between the inner surface of the cap and the outer surface of the chuck head. The pawl also rests in the recess formed between the two annular projections $a^2\ a^2$. The pawl as I here show it is not pivoted at either end but the toothed or working end is adapted to engage the ratchets $a\ a$ and the other end abuts against the inner end of the adjusting screw $k$ which extends through the side of the cap. One or more springs are provided for forcing the toothed end of the pawl normally away from the ratchet $a$ and out of engagement therewith. As here shown, I insert one spring $h$ in a recess $g$ formed in the inner side of the pawl and another spring $i$ in a recess which extends through the side of the cap directly opposite the end of the pawl and so located that the spring will be forced against the end of the pawl and tend to press it away from the ratchet teeth and back toward the adjusting screw $k$. A screw $j$ holds the spring $i$ in place. The pawl is so arranged that when the adjusting screw $k$ is turned back and the pawl released from engagement with the ratchet teeth the cap will be free to turn so that the jaws can be quickly adjusted, but when the screw $k$ is set up the pawl is forced automatically into engagement with the ratchet teeth and the force of the screw is exerted on turning the cap about the chuck head.

In order to force the end of the pawl into engagement with the ratchet teeth I make use of an inclined surface $q$ formed on the inside surface of the cap adjacent to the end of the pawl. When the pawl is pushed forward it is forced downward by the inclined surface against the ratchet teeth and when it is released by the turning back of the adjusting screw $k$ the inclined surface allows it to be lifted away from the ratchet by the springs.

Having thus described the construction of my lathe chuck, its operation and advantages are evident. When the screw $k$ is turned back the cap is free to turn on the chuck head as explained and the chuck may be adjusted by hand to seize any size of tool which may be inserted. Then by turning the screw inward the pawl is brought into engagement with the ratchet and the force of the screw is exerted on the cap and holds it firmly in place until released.

It will be seen that the jaws are not pivoted in the chuck head as in most chucks of this class but they are journaled bodily in the cylindrical recesses which form the strongest sort of bearings for them.

I claim—

1. The herein described lathe chuck consisting of a chuck-head, jaws pivoted therein, the outer ends of said jaws being provided with crank arms having crank pins therein, guide blocks to which said crank pins are pivoted, an adjusting cap fitting over said chuck head, the end of said cap being provided with radiating grooves in which said guide blocks slide and means for clamping said adjusting cap in position.

2. The herein described lathe chuck consisting of a chuck-head having a ratchet on the side thereof and having jaws pivoted therein, crank arms on said jaws, an adjusting cap fitting over said head and adapted to act on said crank arms to rotate said jaws, a recess being formed between said cap and said chuck head, a pawl in said recess an adjusting screw against which said pawl abuts extending through the side of said cap, the working end of said pawl being adapted to engage said ratchet, a spring for forcing said pawl out of engagement with said ratchet and means for forcing said pawl into engagement with said ratchet when said adjusting screw is screwed inward.

3. The herein described lathe chuck consisting of a chuck-head having a ratchet on the side thereof and having jaws pivoted therein, crank arms on said jaws, an adjusting cap fitting over said head and adapted to act on said crank arms to rotate said jaws, a recess being formed between said chuck head and said cap, a pawl in said recess, an adjusting screw against which said pawl abuts extending through the side of said cap, the working end of said pawl being adapted to engage said ratchet, a spring for forcing said pawl out of engagement with said ratchet, an inclined surface being formed in said cap opposite the working end of said pawl whereby it is forced into engagement with said ratchet when said adjusting screw is screwed inward.

4. The herein described lathe chuck having a chuck head with cylindrical recesses in the end thereof and having jaws, the body portions of which are formed of cylindrical segments, the said jaws having crank arms on their outer ends and being adapted to fit within said recesses, pins or projections on the under side of each crank arm, a groove being formed in the end of the said chuck head concentric with said recess for receiving said pin or projection and retaining the jaw in place.

In testimony whereof I affix my signature in presence of two witnesses.

JOHN A. LIDBACK.

Witnesses:
S. W. BATES,
E. DUDLEY FREEMAN.